United States Patent [19]

Toral et al.

[11] Patent Number: 5,346,741
[45] Date of Patent: Sep. 13, 1994

[54] MULTIPACK FOR WOUND ROLLS

[75] Inventors: Jose Toral; Hermann Brandstetter, both of München; Gottfried Lutz, Seefeld; Hartmut Thiele, München, all of Fed. Rep. of Germany

[73] Assignee: BASF Magnetics GmbH, Mannheim, Fed. Rep. of Germany

[21] Appl. No.: 31,906

[22] Filed: Mar. 16, 1993

[30] Foreign Application Priority Data

Mar. 17, 1992 [DE] Fed. Rep. of Germany ... 9203577[U]

[51] Int. Cl.⁵ .................... B65D 61/00; B65D 67/00; B65D 21/02; B65D 6/34
[52] U.S. Cl. ...................................... 428/65; 206/394; 206/397
[58] Field of Search ............... 428/65, 906; 206/394, 206/391, 397

[56] References Cited

FOREIGN PATENT DOCUMENTS 9104918 8/1991 Fed. Rep. of Germany .
9109284.1 11/1991 Fed. Rep. of Germany .

Primary Examiner—Alexander S. Thomas
Attorney, Agent, or Firm—Keil & Weinkauf

[57] ABSTRACT

The multipack for pancakes of relatively large diameter comprises two end plates (1, 2) and an intermediate plate (4), anchored on which is a tube (3) on which the pancakes are arranged in series with cushioning disks placed in between. The end plates include fixing means on their narrow sides for stacking a plurality of the multipacks described on top of and next to one another on one and the same pallet. A film of plastic is drawn over each multipack and each multipack is held together by securely lashed straps, which are drawn over the end plates.

4 Claims, 1 Drawing Sheet

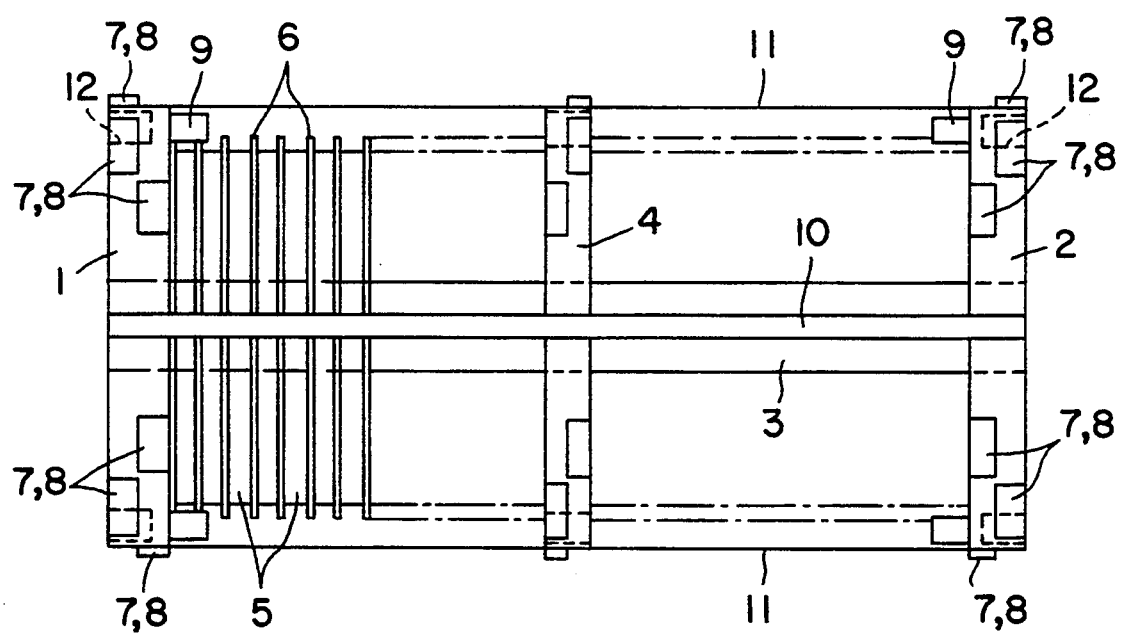

MULTIPACK FOR WOUND ROLLS

The invention relates to a multipack for wound rolls, comprising recording media in tape form, which are wound up onto flangeless hubs with central internal bores, the wound rolls being arranged in series on a horizontal tube and protected against the effect of dust and impact by sheathing and fixing means, it being possible to transport a plurality of rows of wound rolls in one unit.

A multipack of the generic type mentioned above is known from DE-U 91 04 918. In this document, a multipack for pancakes is described, comprising an outer box-shaped supporting framework and a likewise box-shaped inner multicontainer, in which the pancakes are arranged on a plurality of mandrels running horizontally and parallel to one another, the mandrels being firmly anchored on the rear side of the multicontainer and a front covering plate with fixing means being pushed through the free front ends of the mandrels for transporting the multipack once it has been filled. Furthermore, the multipack described includes devices for fixing the pancakes.

Pancakes is the name given to rolls of magnetic tape which have a diameter of up to about 40 cm and comprise a multiplicity of tape windings lying precisely one on top of the other. These pancakes are cost-intensive intermediate products in terms of their production and the type of materials used and sometimes have to be transported over long distances from the manufacturer to the companies carrying out further processing. During such transporting operations, it must be ensured, however, that the pancakes wound with great precision are not distorted by excessive vibrations or damaged by soiling. For this reason, elaborate packaging of the pancakes is necessary for secure transportation.

Although the multipack mentioned at the beginning fulfills these functions, it has the following disadvantages:

1. The mandrels for receiving the rolls of magnetic tape must have great flexural rigidity and be anchored in a complicated way in the supporting framework, since the content of the pack is very heavy if a multiplicity of pancakes of large diameter are arranged in series.
2. The complicated construction of the outer frames means that the said pack is very heavy and voluminous both during transport and during return transport.

Furthermore, DE-U 91 09 284 discloses a multipack for vertically stacked wound rolls, comprising a rectangular baseplate, an identically designed intermediate plate and a top plate, between which in each case a multiplicity of pancakes are stacked, tubes being inserted through the internal bores of the hubs and anchored at the end plates and the intermediate plate. Although cushioning disks are arranged between the individual pancakes, there is the risk of the windings becoming displaced with respect to one another during shipment. This multipack is able to be shipped on a transport pallet, only taking up a small volume during return shipment, since the individual parts can easily be taken apart and transported back on the pallet.

It is therefore an object of the present invention to find a multipack for wound rolls of the generic type mentioned at the beginning which does not have the disadvantages described of the prior art.

We have found that this object is achieved by a multipack having the features mentioned in the defining part of claim 1. Further features emerge from the subclaims, the description and the drawing. The innovation is explained in more detail below with reference to the drawing.

BRIEF DESCRIPTION OF THE DRAWING

The drawing shows the pancakes (5) arranged one after another on a tube (3), with cushioning disks (6) between the pancakes. The tube (3) is attached to the end plates (1, 2) and passes through an intermediate plate (4), and the whole multipack is held together by straps (10, 11) running around the end plates (1, 2) and parallel to the tube (3). The end plates (1, 2) have projections and matching depressions on their narrow sides (7, 8), as well as on their large sides (9, 12).

The multipack according to the innovation comprises two rectangular, preferably square end plates (1, 2), in the geometric center of which a tube (3), the diameter of which corresponds to the internal bore of the hubs, is anchored by inserting or screwing. In addition, at least one rectangular, preferably square intermediate plate (4) is provided as an intermediate support, the dimensions of which correspond to those of the end plate. The pancakes (5) on flangeless hubs, known from the prior art, are arranged in series on the tube in a way which is likewise known; cushioning disks (6), as known from the abovementioned DE-U 91 09 284, are respectively arranged between the pancakes in order to protect the rolls. The end plates and, if appropriate, also the intermediate plates have on their narrow sides projections and matching depressions (7, 8), which are arranged in such a way that a plurality of multipacks of the type described can be stacked on top of and next to one another without the risk of the units being displaced with respect to one another during transport. The intermediate plate (4) prevents bowing of the rolls of tape arranged in series, since it supports the rolls of tape in the center.

As an example, nine or twelve such packs, which in each case take 50 pancakes, can be stacked on a Euro pallet.

The end plates, the intermediate plate and the tube consist of recyclable plastic, for example polystyrene. Once the desired number of pancakes have been arranged in series with the intermediate layers in such a pack, a film of plastic is drawn over the multipack, whereupon the end plates are securely tied together by straps (10, 11) which are laid over the side parts (1, 2) and lashed together.

For return transport, all that is necessary is to stack the end plates and intermediate plates on top of one another. For this purpose, for example the end plates have on one side hollow-cylindrical projections (9), which enter into corresponding holes (12) on the other side of the end plate. The intermediate plates may be designed in a similar way. The number of intermediate plates depends on the number and weight of the pancakes.

We claim:

1. A multipack for wound rolls, comprising recording media in tape form, which are wound up onto flangeless hubs with central internal bores, the wound rolls being arranged in series on a horizontal tube and protected against the effect of dust and impact by sheathing and fixing means, it being possible to transport a plurality of rolls in one unit, wherein each tube is fastened on two rectangular end plates each having two large and four narrow sides, whose narrow sides are located to the outside of the multipack, the wound rolls being separated by flexible compressible intermediate layers lying in between, the end plates including on all four narrow sides projections and matching depressions positioned such that when the multipacks are stacked on top of and next to one another on one and the same pallet, each projection matches the depression above, below or next to it, and a film of plastic being drawn over each multipack and each multipack being held together by a plurality of straps lashed around the end plates.

2. A multipack as in claim 1, wherein mounted between the end plates, there is at least one intermediate plate of the same dimensions as the end plates, with the horizontal tube passing through said intermediate plate(s), said intermediate plates having projections and matching depressions identical to those of the end plates.

3. A multipack as defined in claim 2, wherein the end and intermediate plates and the horizontal tube consist of recyclable plastic.

4. A multipack as defined in claim 1, wherein the end plates and horizontal tube consist of recyclable plastic.

* * * * *